Sept. 16, 1958 G. C. SZIKLAI ET AL 2,852,608

SIGNAL TRANSMISSION SYSTEM

Filed Oct. 14, 1954 3 Sheets-Sheet 1

INVENTORS
GEORGE C. SZIKLAI &
ALDA V. BEDFORD
BY [signature]
ATTORNEY

SIGNAL TRANSMISSION SYSTEM

Filed Oct. 14, 1954 3 Sheets-Sheet 2

INVENTORS
GEORGE C. SZIKLAI &
ALDA V. BEDFORD
BY [signature]
ATTORNEY

Sept. 16, 1958 G. C. SZIKLAI ET AL 2,852,608

SIGNAL TRANSMISSION SYSTEM

Filed Oct. 14, 1954 3 Sheets-Sheet 3

INVENTORS
GEORGE C. SZIKLAI
& ALDA V. BEDFORD

BY [signature]

ATTORNEY

United States Patent Office
2,852,608
Patented Sept. 16, 1958

2,852,608

SIGNAL TRANSMISSION SYSTEM

George C. Sziklai and Alda V. Bedford, Princeton, N. J., assignors to Radio Corporation of America, a corporation of Delaware Application October 14, 1954, Serial No. 462,340

The terminal fifteen years of the term of the patent to be granted has been disclaimed 13 Claims. (Cl. 179—15)

This invention relates to signal transmitting and receiving systems and more particularly to multiplexing arrangements for forming signals in such a manner that a plurality of intelligence signals may be transmitted and received at reduced bandwidths.

With the increasing use of radio signal radiating equipment it becomes desirable and necessary to conserve bandwidth in the radio frequency spectrum. One method of conserving bandwidth utilizing quantizing is shown and described in U. S. Patent No. 2,664,462, issued December 29, 1953, to Bedford and Sziklai. The quantizing process generally involves forming an electrical signal having a plurality of predetermined amplitudes from a continuously varying i. e., smoothly varying electrical signal. The elemental signal magnitudes of the continuously varying signal within a predetermined range are all reduced to a single signal amplitude, resulting in a stepped or quantized signal. In the above referenced U. S. patent, a system is provided wherein a first intelligence signal is quantized or sent only at discrete amplitude levels or quanta levels, and other different intelligence signals are then attenuated to such a degree as to lie in the region between two adjacent quanta levels of the first intelligence signal. The signals so attentuated, are then at discrete intervals, superimposed upon the quantized signal. At the receiver, the received signal is sampled at discrete intervals and divided into the same quanta levels that were formed at the transmitter, thereby separating the information lying between the quanta levels from the quantized signal. This signal separation results in a series of samples from which intelligence signals may be reformed substantially as they originally existed.

In the use of quantizing systems generally, high quality reproduction demands a large number of quanta levels so that the quantized signal more nearly follows the continuous intelligence representing signal. The use of a large number of quanta levels however, demands increased circuitry and high power consumption; as a result quantizing systems have been forced to compromise between quality of reproduction and economy.

Sensing organisms of various types, both natural and mechanical, encounter an inherent difficulty in utilizing high frequency signals with high precision. This is true both in the human ear and the human eye. Advantage may be taken of this difficulty to realize high frequency signals in a multi-intelligence multiplexing system which utilizes quantizing by allowing high frequencies of an intelligence signal to suffer in transmission. Fewer quanta levels may therefore be used in such a transmission system by allowing the high frequency components of the intelligence signal to be coarsely quantized, providing the low frequency components are sufficiently well preserved. The precision of reproduction of high frequency components of an intelligence signal may be sacrificed to gain economy, and such a sacrifice will not be apparent in many signal realizing systems because of the inherent difficulty such realizing systems encounter at high frequencies.

The present invention in its more general form contemplates taking advantage of the inherently lower discrimination of sensing organisms to detect and evaluate high frequency phenomena by multiplexing intelligence bearing signals by sacrificing accuracy of certain high frequency components of the intelligence bearing signals but preserving with more precision certain of the low frequency components of the intelligence bearing signals. A method of effectively preserving the low frequency component signals of the quantized intelligence signals in more precision includes periodically transmitting in residue form a low frequency component of an intelligence signal tending to unquantize the low frequency component at the receiver. The high frequency components of an intelligence signal to which high frequency components are important, may be discretely mixed with certain low frequency components, in such a manner that filtering action can later divide the high and low frequency component signals. The signal of mixed frequency components may then be quantized and periodically added with sampled low frequency components of other intelligence signals.

In more detail the arrangement contemplates the division of each of a group of intelligence bearing signals into a plurality of frequency band signals, the division of the frequency band signals depends upon which of a number of frequency bands the components of the intelligence signal fall into. Certain of the frequency band signals may then be added together. Frequency band signals so added are chosen in such a manner that they may later be separated by frequency filters. The combined frequency band signals and certain other band signals are then combined into a single composite wave or signal by quantizing the combined frequency band signals and sequentially super-imposing on the quantized wave attentuated samples of the other frequency band signals, and samples of the combined frequency band signal components which fall within particular frequency range and which would otherwise have been lost in the quantizing operation. The composite multiplexed signal is then transmitted to a receiver where after detection, the multiplexed signal is divided into signals which are representative of the original frequency band signals. The division of the multiplexed signal into the frequency band signals is performed at the receiver by first quantizing the composite wave to result in a remainder or difference signal plus a receiver quantized wave. The difference signal is then sampled and multiplexed into a variety of signals each of which is representative of certain of the frequency bandwidth signals. The receiver quantized wave may be filtered into a variety of signals representative of certain other of the frequency band signals if such signals were combined in its formations. The signals formed at the receiver which are representative of the various frequency band signals may then be combined to form signals representative of the original intelligence bearing signals.

An object of this invention is to provide an improved system for transmitting and receiving several intelligence bearing signals at reduced bandwidth.

Another object of this invention is to provide improved color television systems which occupy the same frequency channel bandwidth as a monochrome television system.

A further object of this invention is to provide a system for transmitting and receiving several intelligence signals at reduced bandwidth utilizing quantizing techniques in which fewer quanta levels are required.

Other and incidental objects of this invention will be apparent to those skilled in the art from reading the following specification and on inspection of the accompanying drawings in which:

Figure 1A includes a showing of an intelligence signal and various steps of quantizing the intelligence signal.

Figure 1B includes a showing of a reduced amplitude first intelligence signal.

Figure 1C includes a showing of a reduced amplitude second intelligence signal.

Figure 1D includes a showing of a reduced amplitude third intelligence signal.

Figure 1A:
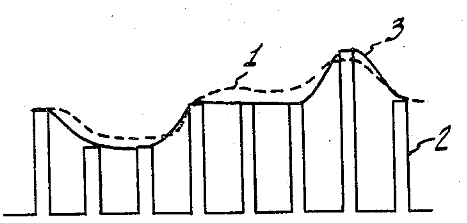
Figure 1E shows a combination of several sampled intelligence signals.
Figure 1F shows a multiplexed signal formed by adding quantized pulses of a first intelligence signal to sampled reduced amplitude pulses of a second, third, and fourth intelligence signal.
Figure 1B:
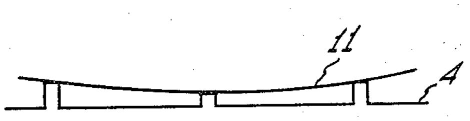
Figure 1C:
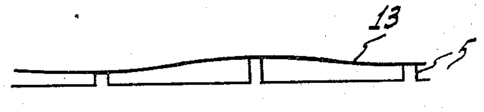
Figure 1D:
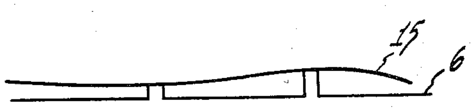
Figure 1E:
Figure 1F:
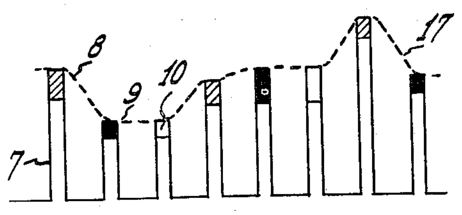
Figure 1G:
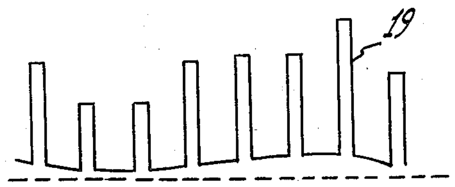

Figure 1G includes a showing of a reproduced intelligence signal.

Figure 2:
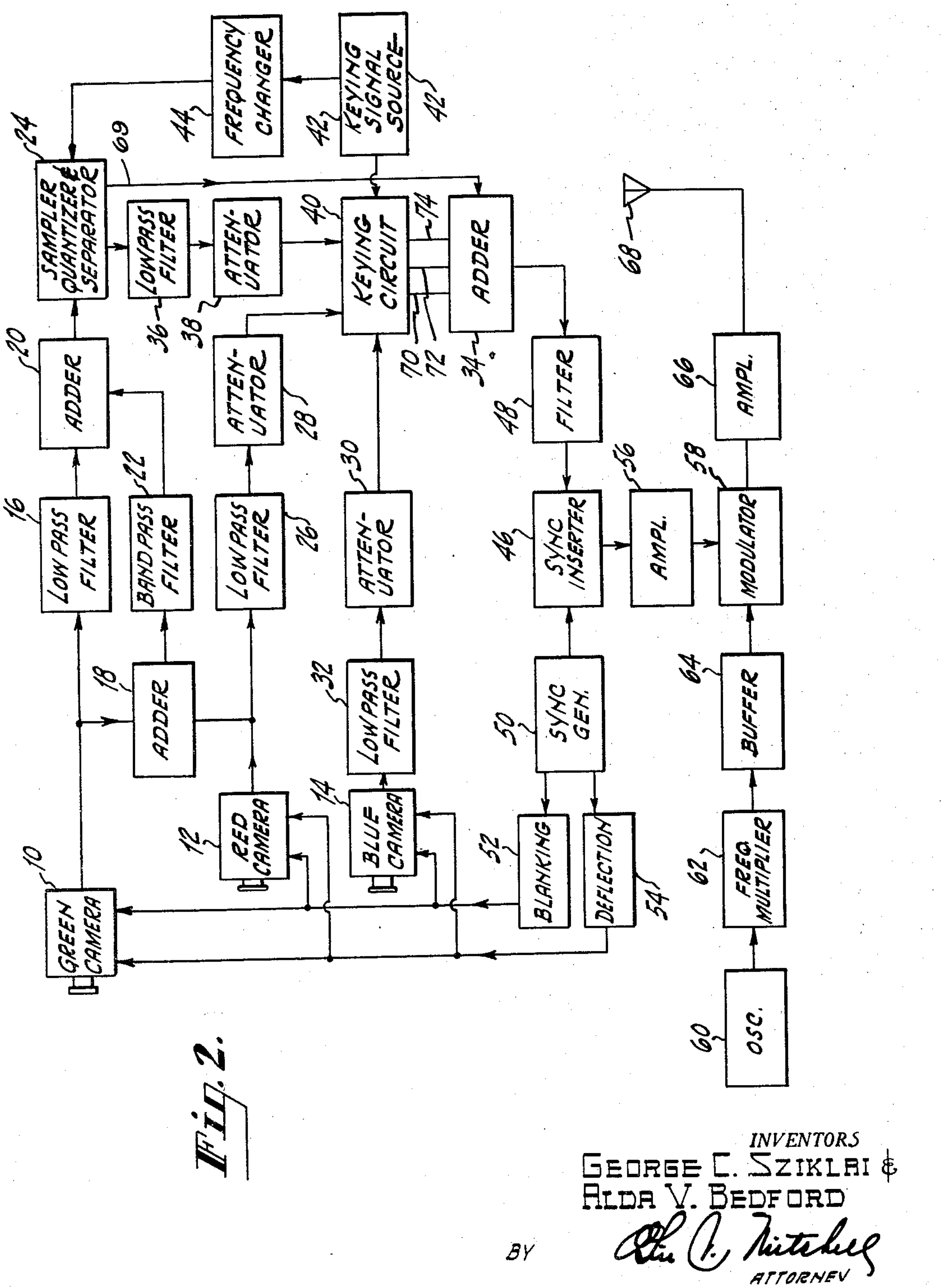

Figure 2 shows a block diagram of a transmitter constructed according to a form of the invention.

Figure 3 shows a circuit and block diagram of one type of a keying circuit.

Figures 4, 5, 6, 7:
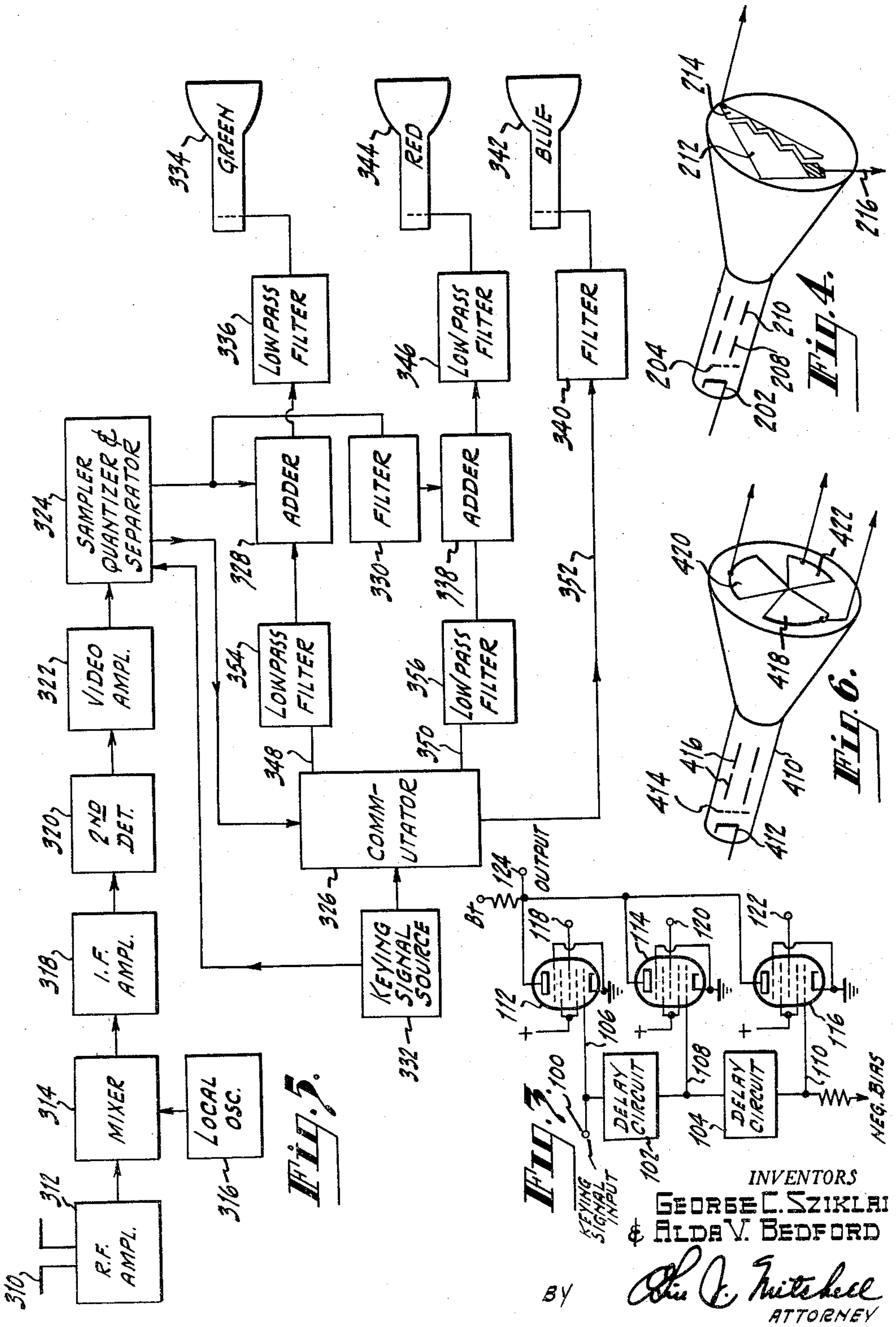

Figure 4 shows a schematic diagram of one type of a quantizer and separator.

Figure 5 shows a block diagram of a receiver constructed according to a form of the invention.

Figure 6 shows a schematic diagram of one form of a signal commutator.

The invention is described below as applied to a color television transmitting and receiving system. However, it is to be understood that the invention may be applied to transmit and receive any plurality of intelligence signals at reduced bandwidths, or a single signal of broad bandwidth, part of which has been heterodyned to a lower frequency range. Furthermore, although it is disclosed, say for example, in relation to a transmission system employing radiated energy, it may equally well be applied to systems employing any type of transmission.

The operations involved in carrying out the invention will first be described, somewhat briefly, following which the apparatus for performing these operations and a detailed description of the functioning of the apparatus will be given.

Referring to Figure 1A which shows the steps of quantizing an intelligence signal, curve 1 is a continuous intelligence bearing signal which may contain several frequency components and which it is desired to quantize. If the signal of curve 1 is sampled at periodic intervals and one of a discrete number of quanta levels is formed depending upon the amplitude of curve 1, then a sampled quantized signal as shown in curve 2 will be generated. The sample quantized signal shown in curve 2 is a series of sampling pulses, each pulse having one of a number of predetermined amplitudes depending upon which of the predetermined amplitudes more nearly fits the level of curve 2 at the time of sampling. To reform a continuous curve from the sampled quantized curve 2 does not result in curve 1 but results in a curve 3. Comparison of curve 1 and curve 3 will indicate that though some information is lost by the quantizing and reforming process, curve 3, none the less, may be sufficiently indicative of the intelligence found on curve 1 for many purposes. In the system of the invention, a first intelligence signal is sampled and quantized into a sampled and quantized signal as shown in curve 2. Other intelligence signals which will be described later are represented in curves 1B, 1C, and 1D. These signals which have relatively low amplitudes are discretely sampled at one-third the sampling rate of the sampled quantized signal of curve 2. Such a sampling process of signals shown in curves 11, 13 and 15 results in a pulsed signal as shown in curves 4, 5, and 6 respectively of Figures 1B, 1C, and 1D. These pulsed signals are then added together to result in a voltage signal as shown in curve 1E. The signal shown in curve 1E is then in turn added to the sampled quantized signal shown in curve 2 to result in a pulse signal as shown in Figure 1F which represents the multiplexed signals for transmission. The curve 7 of Figure 1F represents the sampled quantized signal as shown in curve 2. Areas 8, 9 and 10 of Figure 1F represent the attenuated sampled signals as shown in Figures 1B, 1C and 1D respectively. By filtering the pulse signal of Figure 1F the smooth signal 17 which passes through the peaks of the pulses is produced. This signal can be transmitted by a channel of relatively narrow bandwidth.

To reform the plurality of intelligence signals from the multiplexed signal the signal of curve 17 is sampled and quantized and then the superimposed information as shown in areas 8, 9 and 10 is removed; this yields signal 7. The information in areas 8, 9 and 10 is then commutated into 3 separate signals as shown in Figures 1B, 1C and 1D respectively, then amplified and filtered to form smooth intelligence signals. The quantized signal of curve 7 may then also be used to produce an electric signal after filtering, which is smooth but still objectionably quantized. The invention includes means for removing the quantized aspect of this signal so far as low frequencies are concerned. One method is to make the signal represented by curve 1D carry low-frequency components which correspond to the low-frequency components of the error in signal 7 caused by the quantizing. Then in the receiver the recovered signal corresponding to 1D is filtered and added to the signal 7 with the correct polarity to restore the loss as shown by Figure 1G. The quantization of the high frequency components remain but the eye is less critical of amplitudes at these frequencies which correspond to fine detail. As will be explained in detail below the signals corresponding to the curves 1B and 1C can carry additional low-frequency information for reproducing pictures in color.

Referring now to Figure 2 which shows a transmitter constructed in accordance with this invention, there is shown a green camera 10, a red camera 12, and a blue camera 14. The cameras, 10, 12, and 14 are utilized for deriving three intelligence bearing signals each of which represents a partial image of a primarily light color of an image being televised.

The human eye has a highest acuity for the color green and for that reason in this illustrative system green will be the most carefully preserved of the intelligence signals. The output signal from the green camera 10, a green image signal, is fed to a low pass filter 16 and to an adder circuit 18. Red camera 12 is also connected to deliver its output, a red image signal, to the adder circuit 18 and then to a band-pass filter 22. The output from the band pass filter 22 which is the mixed high frequency components of the image signals from the green camera 10 and the red camera 12, is connected to an adder circuit 20. The output from the low pass filter 16 is also connected to the adder circuit 20 wherein a low frequency component of the green image signal is added with the mixed high components of the green and red image signals. The adder circuit 20 is then connected to a sampler quantizer and separator 24 where the output from the adder is sampled, quantized, and separated. The output from the red camera 12 is also connected to a low pass filter 26 and thence to an attentuator 28, where the red image signal is attentuated to the desired relatively low level. The blue camera 14 is connected to an attentuator 30 through a low pass filter 32. The two outputs from the quantizer and separator 24 are a sampled quantized signal and a sampled difference signal. The difference signal is the difference between the quantized signal and the signal put into the quantizer and separator 24. The quantized signal which is also sampled in the quantizer and separator 24 is fed directly to the adder circuit 34, whereas the difference signals are fed to the adder circuit 34 through a low-pass filter 36, an attenuator 38 and a keying circuit 40. The outputs from the attentuators 28 and 30 are also fed to the adder circuit 34 through the keying circuit 40. The keying circuit 40 is connected to a keying signal source 42 by which it is controlled. The keying signal source 42 is also connected to control the sampling of the quantizer and separator 24 after passing its signal through a frequency changer 44. The output from the adder circuit 34 which is the composite multiplexed signal shown in Figure 1F is fed to a sync inserter 46 through a filter 48. The sync inserter 46 receives sync signals from a sync generator 50. The sync generator 50 also controls the scanning and blanking processes at the cameras 10, 12 and 14. The camera control circuits from the sync generator 50 include a blanking circuit 52 and a deflection circuit 54. The sync inserter 46 is connected to deliver a signal to an amplifier 56, thence to a modulator 58 of a conventional transmission system. The conventional transmission system includes an oscillator 60 for generating electric signals which are then fed to a frequency multiplier 62 to generate electrical signals of a desired frequency. The electrical signals of the desired frequency are then fed to a buffer stage 64, thence to the modulator 58 to be modulated with the composite multiplexed signal from the amplifier 56. The output from the modulator 58 is then fed to a final amplifier 66 after which it is radiated at an antenna 68.

The operation of the system of Figure 2 may be better explained with periodic references to the curves of Figures 1A, 1B, 1C, 1D, 1E, 1F, and 1G, in which time is plotted as abscissa and signal amplitude is plotted as ordinate. The output from the green camera 10, the green image signal, is divided into 2 frequency component signals by the low-pass filter 16 and the band pass filter 22. The signals in the lower band of frequencies, those which pass through the low-pass filter 16, are then added in the adder circuit 20 with a complementary higher band of frequency signals not only from the green camera 10 but also from the red camera 12. The derivation of signals from the higher frequency ranges is accomplished in the adder circuit 18 and the band pass filter 22. The output from the adder circuit 20 is therefore a continuous wave having low frequencies representative of a green color image and high frequencies representative of both a green color image and a red color image. The mixing of the signals within the high frequency range is performed according to a system shown and described in U. S. Patent No. 2,554,693, issued May 29, 1951, to Alda V. Bedford. Generally, the above referenced U. S. Patent No. 2,554,693, shows and describes apparatus wherein the mixing of the high frequency portions of color image signals may be performed due to the inability of the eye to distinguish fine detail residing in difference in color carried by high frequency components. The output from the quantizer and separator 24 in a lead 69 is a sampled quantized signal as shown in curve 2 of Figure 1A and which is a quantized representation of the wide frequency band continuous signal fed to the quantizer and separator 24 from the adder circuit 20. The signal from the red camera 12, the red image signal, which passes through the low pass filter 26 is attenuated in the attenuator 28 to result in a curve 11 as shown in Figure 1B. The attenuated signal from attenuator 28 is then fed to the keying circuit 40 where it may be discretely sampled to form a signal as shown in curve 4 of Figure 1B. The low frequency component signal from blue camera 14 after passing through low-pass filter 32 is also attentuated to form a signal as shown by curve 13 of Figure 1C, and fed to the keying circuit 40. The output sample signal as shown by curve 5 is fed to the adder circuit 34. The signal fed to the low pass filter 36 from the quantizer and separator 24 is representative of the difference between the quantized signal which appears in a lead 69 and the input signal from the adder circuit 20. A system for deriving such a difference signal is shown and described in U. S. Patent No. 2,617,879, issued November 11, 1952, to G. C. Sziklai. The difference signal from the quantizer and separator 24 is passed through a low pass filter 36 which removes the high frequency components from the signal resulting in a low frequency difference signal as shown in curve 15 of Figure 1D. The low frequency difference signal of curve 15 is attenuated in attenuator 38 and sampled in keying circuit 40 to form a signal as shown in curve 6 of Figure 1D. The three output signals from the keying circuit 40 in leads 70, 72, and 74 are shown in curves 4, 5, and 6 of Figures 1B, 1C and 1D respectively. The keying circuit 40 serves to sequentially sample the various continuous narrow band signals as shown in curves 11, 13 and 15 at discrete intervals such that when one signal is being sampled the other two signals are not being sampled. The adder circuit 34 thus receives through the lead 69 a signal as shown in curve 2 of Figure 1A and through lead 70 a signal as shown in curve 4 of Figure 1B, through lead 72 a signal as shown in curve 5 of Figure 1C, and through lead 74 a signal as shown in curve 6 of Figure 1D. The addition of the above signals received at the adder circuit 34 results in a composite multiplexed sampled signal as shown in the overall curve of Figure 1F. An analysis of this curve will reveal that the quantized portion shown by curve 7 contains a low frequency component of the green image signal plus the high frequency components of both the green and the red image signal. The superimposed portion area 8 represents an attenuated sampled signal of the low frequency component of the red image signal. The superimposed portion area 9 represents an attenuated sampled signal of the low frequency component of the blue image signal. The superimposed portion area 10 represents a sampled attenuated signal representative of the low frequency green image signal difference between the quantized and unquantized green image signal and which would have otherwise been lost in the quantizing process. The composite multiplexed signal then has a sync signal inserted by the sync inserter 46. The output from the sync inserter 46 is then modulated and transmitted in the usual manner.

In regard to the sampling system utilized in the practice of this invention filter 48 preferably limits the signal to approximately one-half the sampling frequency, and has a linear phase characteristic. This limitation is imposed upon the frequency response of the system in order to use the minimum radio bandwidth and still allow accurate recovery of all original sample amplitudes. Limitation of the cross-talk effect of the transient of any one sampling pulse upon other samples is accomplished by passing the samples through the system in such a manner that the bandwidth is restricted in such a way that the transients pass through zero voltage during the other sampling intervals and therefore do not add or subtract to the other samples. Such a system is shown and described in the above reference U. S. Patent No. 2,664,462.

Referring now to Figure 3 there is shown a keying circuit which may be used to function as the keying circuit 40 in Figure 2. A keying signal input terminal 100 is adapted to receive a sinusoidal potential. Connected to the keying signal input terminal 100 is a first delay circuit 102 which in turn is connected to a second delay circuit 104, which in turn is connected through an impedance to a reference level potential. The signal appearing at the keying signal input terminal 100 is thus delayed a predetermined amount in delay circuits 102 and 104. It may therefore be seen that three out-of-phase sinusoidal signals will appear in leads 106, 108, and 110 and are applied to the control grids of vacuum tubes 112, 114, and 116 respectively. Vacuum tubes 112, 114, and 116 are penti-grid tubes having a control grid, two secreen grids, a suppressor grid, and a second input control grid. When the sinusoidal keying voltage appearing at lead 106 and the control grid of tube 112 reaches a predetermined level the tube will be rendered conductive, however, the plate current will depend upon the signal placed on the second control grid through input terminal 118. With similar operation of tubes 114 and 116 it may be seen that the three tubes 112, 114 and 116 will alternately be rendered conductive by the three phase voltages applied to their control grids as the three phase voltages alternately reach a predetermined magnitude at the grids. The tubes 112, 114 and 116 are rendered conductive at points substantially 120 degrees out of phase from each other and thus the various inputs at input terminals 118, 120 and 122 alternately appear at the output terminal 124 during discrete periods. It may therefore be seen that the three inputs to the keying circuits 40 of Figure 2 are alternately combined as shown in the curve of Figure 1E.

Figure 4 shows a tube for performing the quantizing, separating and sampling function of the quantizer and separator 24 of Figure 2. The tube schematically shown in Figure 4 is a special type cathode ray tube. The tube is provided with a cathode 202, a control grid 204, an accelerating electrode 205, a focussing anode 208, deflection plates 210, and a target anode composed of two parts, 212 and 214. The beam forming elements of the tube are so arranged as to produce a flat cathode ray beam rather than the customary cylindrical cathode ray beam. That is, the cross-section of the beam is more nearly a line rather than a point. A system for forming such an electron beam is shown and described in U. S. Patent No. 2,434,713, granted to Mueller, January 20, 1948. The target 212 has several discrete steps and target 214 is shaped and arranged to fit within the steps of the target 212. The amplitude of a signal applied to the deflecting plates 204 will determine upon which step the flat cathode ray beam will fall. In the event the signal is from zero to a predetermined amplitude, the flat cathode ray beam will fall, at some level, upon shaded area 216 of target 212 and a signal of a predetermined amplitude level will be formed. Increasing amplitude of signal will cause the flat beam to be moved up onto other steps of target 212, thereby forming signals of increased magnitude. As the beam moves higher more of the flat electron beam impinges on anode 212 and the magnitude of the output signal appearing at terminal 216 increases in a step fashion. A portion of the flat cathode ray beam which does not impinge upon the anode 212, will fall upon the anode 214. Therefore, the anode 214 will receive a signal which is proportional to the difference between the signal appearing upon the deflecting plates 210 and the quantized signal appearing at the output terminal 216. The sampling in the tube shown in Figure 4 is performed by keying the cathode ray beam on and off by means of the control grid 204. A similar quantizer and separator is shown and described in the above referenced U. S. Patent No. 2,664,462.

Referring now to Figure 5 there is shown a receiving system for receiving and decoding a multiplexed signal generated and radiated from the transmitter circuit as shown in Figure 2. The transmitted signal is received on an antenna 310 and fed to an RF amplifier 312, thence after amplification to a mixer 314 where it is combined with local oscillations from a local oscillator 316. The output from the mixer 314 is coupled to an I. F. amplifier 318. The I. F. amplifier 318 is coupled to a second detector 320, thence to a video amplifier 322. The output from the video amplifier 322 thus becomes the multiplexed signal as shown in the envelope curve of Figure 1G. The multiplexed signal from the video amplifier 322 is fed to a sampler quantizer and separator 324, which is similar to that described and shown with reference to Figure 4. The two outputs from the quantizer and separator 324 are; first a receiver quantized wave which is fed to both an adder 328 and a filter 330, and a second difference signal which is fed to an electric commutator 326. A keying signal source 332 provides a keying signal for the commutator 326 and the sampler, quantizer and separator 324 which is of the same phase and frequency as the keying signal used in the transmitter system. Adder circuit 328 is coupled to an image reproducing cathode ray tube 334 through a filter 336. The commutator 326 is connected to deliver another signal through low-pass filter 350 to an adder 338 and still another signal to a filter 340. The filter 340 is connected to an image reproducing tube 342. Adder 338 is connected to an image reproducing tube 344 through a filter 346.

In the operation of the circuit shown in Figure 5 the curves as shown in Figures 1A, 1B, 1C, 1D, 1E, 1F and 1G are representative of signals appearing within both the transmitter and receiver therefore, a description of the operation of Figure 5 will refer to these curves. The multiplexed signal which is applied to the sampler quantizer and separator 324 from video amplifier 322 is shown by the curve 17 of Figure 1F. The operation of sampler, quantizer and separator is to sample and quantize the wave as shown in Figure 1F at periodical intervals depending upon the frequency of the signal from keying signal source 322. The signal from the keying source 322 is such that the multiplexed signal is sampled at the same intervals at the receiver that it was at the transmitter.

One of the two signals produced by the sampler, quantizer and separator is the quantized samples shown as curve 7 of Figure 1F, the quantizing process consisting in clipping each pulse to the nearest quanta level where the quanta levels are relatively the same as those used in the transmitter. The other signal produced by the sampler, quantizer and separator is samples of the difference signal corresponding to the difference between the input signal and the quantized output signal, and also samples of the other color signals shown by curves 1B and 1C. The difference signal is shown by curve 1E which is composed of the cross-hatched areas 8, blackened areas 9 and marked off areas 10. This difference signal is fed to the commutator 326. The quantized portion of the composite signal as shown by curve 7 is fed to adder 328 and filter 330. The multiplexed signal has thus been divided into a quantized signal as shown in curve 2 of Figure 1A and the difference signal comprising an attenuated sampled signal as shown in the curve of Figure 1E. The commutator 326 serves to time divide i. e., separate on a time basis the clipped portion of the multiplexed signal or the attenuated sampled signal into 3 separate intelligence signals and will be discussed later in greater detail. The function of the multiplexer 326 is to derive signals as shown in curves 4, 5 and 6 from a signal as shown in the curve of Figure 1E. The signals represented by the curves 4, 5, and 6 consist respectively of every third pulse of the curve of Figure 1E. The signals of the curves 4, 5, and 6 respectively appear on leads 350, 352, and 348 sequentially in time alternation. The signal appearing on lead 348 which is indicated by curve 6 is smoothed by low-pass filter 354 to form a signal as shown at 15 and then is additively combined with the quantized signal as shown in curve 2 in adder 328. The output from adder 328 thus becomes the green image representing low frequency signal in a quantized state plus a low-frequency residue, i. e., the difference signal of the transmitter quantizer-separator 24, from the green low-frequency image signals, and the high frequency green and red image representing signals, as shown by curve 19 of Figure 1G. An analysis of this curve shows that it properly consists of the sum of wave 7 of Figure 1F and curve 15 of Figure 1D, adjusted to suitable relative amplitudes. In the drawing of curve 19 the relative amplitude of the component represented by curve 15 was exaggerated to make its contribution noticeable. The correct relative amplitude of the component of curve 15 is much smaller because the amplitudes of the low frequency components is reduced in accordance with the very short duration of the pulses.

The output of adder 328 (curve 19) is applied to a green reproducing tube 334, after being filtered by filter 336 into a continuously varying signal free of samples.

The second commutated signal which appears in lead 350 is passed through low-pass filter 356 to remove its low-frequency samples and is then added in adder 338 to a high frequency component of the quantized signal which is separated from the low frequency component of the green signal by high-pass filter 330. The application of the combined high frequency red and the high frequency green component signals to both the green and the red image reproducing tubes is in accordance with the system described in the above referenced U. S. Patent No. 2,554,693. Filter 346 forms the red image signal pulses into a continuously varying signal. The third signal from the commutator 326 appears in lead 352 and is applied directly to image reproducing tube 342 through the low-pass filter 340 which forms the signal into a continuously varying signal.

It may therefore be seen that the green reproducing tube 334 receives the low frequency green signals with full accuracy, in spite of the low frequency green signals having been quantized for transmission, because a sample signal representative of part of the information lost in the quantization of the low frequency green signals has been sent in the composite wave and is utilized to repair the damage incurred by quantizing low frequency components of the green image signal. Only the mixed-highs component remains quantized. The signals received at the red reproducing tube 344 and the blue reproducing tube 342 are representative of the original intelligence signals so far as low-frequency components are concerned. In addition the red reproducing tube has quantized mixed-highs signals, which are acceptable because of the eye having relatively low-sensitivity to brightness values of very small areas.

A form of the commutator 326 is shown schematically in Figure 6. A cathode ray beam tube 410 having a cathode 412, a control grid 414 and deflecting plates 416 serves well as a commutator. The cathode ray tube 410 has three target anodes, 418, 420, and 422. The deflecting means are such that the cathode ray beam in the tube 410 is deflected in a circular fashion over the target anodes 418, 420, and 422. A signal appearing at the control grid 414 will thus alternately appear on different of the target anodes 418, 420 and 422. It may therefore be seen that a signal having combined intelligence may be time separated or commutated into a variety of separate signals. A system of commutating similar to that shown in the keying circuit of Figure 3 could be utilized.

In the above described system the green image signal was transmitted directly, that is without multiplexing, so that it would be useable to operate black and white receivers now in general use. This arrangement will provide attractive black and white picture because the eye is most sensitive to green colors, having a response curve somewhat similar to that exhibited by Verichrome films. Therefore, if the black and white receivers now in use were to receive a signal sent out by the transmitter of this invention, a satisfactory black and white image would be reproduced because not only is the green signal transmitting at full bandwidth, but the red and blue signal are added at reduced amplitude with restricted bandwidth.

Having thus described the invention, what is claimed is:

1. A multiplexing system comprising an input circuit adapted to receive a plurality of narrow frequency band signals and a wide frequency band signal, means connected to said input circuit for restricting said wide frequency band signal to a plurality of discrete values of amplitude to form a quantized signal, means for generating a difference signal, said difference signal being proportional to the difference between said wide frequency band signal and said quantized signal, filter means connected to receive said difference signal for eliminating components of said difference signal which lie outside a narrow frequency band to form a filtered signal, signal amplitude adjusting means for adjusting signal amplitudes such that said narrow band signals and said filtered signal lie within adjacent of said discrete values of amplitude and means for periodically adding said narrow band signals and said filtered signal sequentially to said quantized signal.

2. A multiplexing system comprising an input circuit adapted to receive a plurality of narrow frequency band signals and a wide frequency band signal, means connected to said input circuit for restricting said wide frequency band signal to a plurality of discrete values of amplitude to form a quantized signal, means for sampling said quantized signal at predetermined intervals to form a sampled quantized signal, means for deriving a difference signal, said difference signal being proportional to the difference between the ampltiude of said wide frequency band signal and said quantized signal, filter means connected to receive said difference signal for eliminating components of said difference signal which lie outside a narrow frequency band to form a filtered signal, signal amplitude adjusting means for adjusting the signal amplitude such that said narrow band signal and said filtered signal lie within adjacent of said discrete values of amplitude, and means for adding during said predetermined intervals said narrow band signals and said filtered signal sequentially to said sample quantized signal.

3. A multiplexing system comprising an input circuit adapted to receive a plurality of narrow frequency band signals and a wide frequency band signal, means connected to said input circuit for restricting said wide frequency band signal of a plurality of discrete values of amplitude to form a quantized signal, means for sampling said quantized signal at predetermined intervals to form a sampled quantized signal, means for deriving a difference signal, said difference signal being proportional to the difference between the amplitude of said wide frequency band signal and said quantized signal, filter means connected to receive said difference signal for eliminating components of said difference signal which lie outside a narrow frequency band to form a filtered signal, signal amplitude adjusting means for adjusting the amplitudes of said signals such that said narrow band signal and said filtered signal lie within adjacent of said discrete values of ampltiude, means for adding said narrow band signals and said filtered signal sequentially to said sampled quantized signal to form a multiplexed signal, said predetermined interval occurring at a frequency at least twice the frequency of the highest used frequency present in said wide frequency band signal, and means for converting said multiplexed signal into a smoothly varying multiplexed signal.

4. A transmitter signal forming system comprising means for deriving a plurality of signals each of said signals having its amplitude varied in accordance with a respective intelligence, one of said signals being a wide frequency band signal, other of said signals being narrow frequency band signals, means for quantizing said wide frequency band signal to form a quantized signal, means for deriving a difference signal, said difference signal being proportional to the difference between the amplitude of said wide frequency band signal and the amplitude of said quantized signal, filtering means for eliminating certain frequency components from said difference signal to form a filtered signal, signal amplitude variation means for causing the amplitude variations of said narrow frequency band signals and said filtered signal to lie between levels of said quantized signal and means for adding said narrow frequency band signals and said filtered signal sequentially to said quantized signal.

5. A transmitter signal forming system comprising means for deriving a plurality of signals each of said signals having its amplitude varied in accordance with a respective intelligence, means for frequency limiting one of said signals to form a wide frequency band signal, means for frequency limiting other of said signals to form a plurality of narrow frequency band signals, means for quantizing said wide frequency band signal to form a quantized signal, means for deriving a difference signal, said difference signal being proportional to the difference between the amplitude of said wide frequency band signal and the amplitude of said quantized signal, filtering means for eliminating certain frequency components from said difference signal to form a filtered signal, signal amplitude variation means for causing the amplitude variations of said narrow frequency band signals and said filtered signal to lie between quantized levels of said quantized signals, and means for adding said narrow frequency band signals and said filtered signals sequentially during predetermined intervals to said quantized signal.

6. A transmitter signal forming system comprising means for deriving a plurality of signals each of said signals having its amplitude varied in accordance with a respective intelligence, one of said signals being a wide frequency band signal, other of said voltage waves being narrow frequency band signals, means for quantizing said wide frequency band signal to form a quantized signal, means for deriving a difference signal, said difference signal being proportional to the difference between the amplitude of said wide frequency band signal and the amplitude of said quantized signal, sampling means for periodically sampling said quantized signal during recurring intervals to form sampled quantized signals, filtering means for eliminating certain frequency components from said difference signal to form a filtered signal, signal amplitude variation means for causing the amplitude variations of said narrow frequency band signals and said filtered signal to lie between quantized levels of said quantized signals, and means for adding said narrow frequency band signals and said filtered signal during said recurring intervals sequentially to said sampled quantized signals.

7. A transmitter signal forming system comprising means for deriving a plurality of voltage waves each having its amplitude varied in accordance with a respective intelligence, means for frequency limiting and combining said voltage waves such as to form a wide frequency band signal, and a plurality of narrow frequency band signals, means for quantizing said wide frequency band signal to form a quantized signal, means for deriving a difference signal, said difference signal being proportional to the difference between the amplitude of said wide frequency band signal and the amplitude of said quantized signal, sampling means for periodically sampling said quantized signal during recurring intervals to form sampled quantized signals, filtering means for eliminating certain frequency components from said difference signal to form a filtered signal, signal amplitude variation means for causing the amplitude variations of said narrow frequency band signal and said filtered signals to lie between quantized levels of said quantized signals, means for adding said sampled signals sequentially to said narrow frequency band signals and said filtered signal during said recurring intervals to provide a multiplexed signal, said recurring intervals occurring at a frequency at least twice the frequency of the highest useful frequency present in said wide frequency band signal, and means for converting said multiplexed signal into a smoothly varying signal.

8. An apparatus for multiplexing a plurality of signals for transmission comprising: a source of wide-band signal, at least one source of narrow-band signal, means for quantizing said wide-band signal to produce a quantized signal having only discrete amplitudes at the sampling times and a residue signal having amplitudes corresponding to the difference between said quantized signal and said wide-band signal, filter means for restricting the bandwidth of said residue signal to produce a narrow-band residue signal, means for multiplexing said narrow-band residue signal with at least one of the narrow-band signals to produce a wide-band multiplex signal, means for adding the wide-band multiplex signal to said quantized signal at such relative amplitudes that the multiplex signal occurs only in the amplitude range between adjacent quantizing levels at the sampling times.

9. A receiver system for forming a plurality of intelligence bearing signals from a multiplexed signal comprising means for quantizing said multiplexed signal to develop a quantized signal, said quantized signal being such that it passes from one discrete level to another discrete level as said multiplexed signal goes through proportional levels, means for detecting a difference signal between said quantized signal and said multiplexed signal, commutating means for commutating said difference signal into plural commutated signals, means for additively combining certain of said commutated signals and said quantized signal during predetermined intervals to form an intelligence signal, and means for causing said other of said commutated signals and said intelligence signal to be smoothly varying signals to form other intelligence signals.

10. A receiver system for forming a plurality of intelligence bearing signals from a multiplexed signal comprising means for quantizing said multiplexed signal to develop a quantized signal, said quantized signal being such that it passes from one discrete level to another discrete level as said multiplexed signal goes through proportional levels, means for detecting a difference signal between said quantized wave and said multiplexed signal, means for sampling said difference signal and said quantized signal at predetermined intervals to produce sampled quantized signals and sampled difference signals, means for commutating said sampled difference signals into commutated signals, means for combining certain of said commutated signals with said sampled quantized signals during said predetermined intervals to form combined signals, and means for forming said combined signals and other of said commutated signals into smoothly varying intelligence signals.

11. A receiver system for forming a plurality of intelligence bearing signals from a multiplexed signal comprising means for quantizing said multiplexed signal to develop a quantized signal, said quantized signal being such that it passes from one discrete level to another discrete level as said multiplexed signal goes through proportional levels, means for detecting a difference signal between said quantized signal and said multiplexed signal, commutating means for commutating said difference signal into plural commutated signals, means for separating said quantized signal into a plurality of signals by frequency discrimination means to form frequency limited signals, and means for additively combining during predetermined intervals certain of said frequency limited signals and certain of said commutated signals.

12. A transmitter system for forming a multiplexed signal from a plurality of first intelligence signals and a receiver system for forming a plurality of second intelligence signals from a multiplexed signal comprising: means for restricting one of said first intelligence signals to one of a plurality of discrete values of amplitude to form a first quantized signal, means for regenerating a difference signal, said difference signal being proportional to the difference between said one of said first intelligence signals and said first quantized signal, signal amplitude adjusting means for adjusting the amplitudes of said signals such that others of said first intelligence signals and said difference signal lie within adjacent ones of said discrete values of amplitude, means for periodically adding said first quantized signal sequentially to said others of said first intelligence signals and said difference signal to form a multiplexed signal, means for causing said multiplexed signal to be a smoothly varying multiplexed signal, means for transmitting said smoothly varying multiplexed signal, means for receiving said smoothly varying multiplexed signal, means for quantizing said smoothly varying multiplexed signal to produce a second quantized signal, means for sampling said second quantized signal to produce a sampled quantized signal, means for producing a difference signal which varies as the difference between said smoothly varying multiplexed signal and said second quantized signal, means for separating said difference signal into a plurality of time divided signals, and signal combining means for combining at least one of said time divided signals with said quantized signals.

13. Apparatus for multiplexing, ttransmitting receiving and reconstructing a wide-band signal and at least one narrow-band signal, comprising: means for quantizing said wide-band signal to produce a quantized signal and a residue signal, filter means for restricting the band-width of said residue signal, means for multiplexing the resulting narrow-band residue signal and said narrow-band signal to produce a wide-band multiplex signal, means for adding the wide-band multiplex signal to said quantized signal at a relatively low level so said multiplex signal occurs only in the amplitude range between adjacent quantizing levels at the sampling times to form a composite multiplex signal, means for transmitting and receiving said composite multiplex signal, means for separating the received signal into a recovered quantized signal and a recovered residue signal, means for reconstructing at least two narrow-band signal components from said recovered residue signal and means for adding one of the reconstructed narrow-band signal components to said recovered quantized signal to form a signal which is restored so far as low frequencies are concerned.

References Cited in the file of this patent

UNITED STATES PATENTS

| | | |
|---|---|---|
| 2,516,587 | Peterson | July 25, 1950 |
| 2,530,538 | Rack | Nov. 21, 1950 |
| 2,664,462 | Bedford et al. | Dec. 13, 1953 |
| 2,784,256 | Cherry | Nov. 5, 1957 |